United States Patent [19]
Jonsson

[11] Patent Number: 5,991,631
[45] Date of Patent: Nov. 23, 1999

[54] SYSTEM IN WHICH CALL CONNECTIONS ARE ESTABLISHED BETWEEN A MASTER SWITCH AND A SLAVE SWITCH VIA BYPASS SIGNALING

[75] Inventor: Björn Erik Rutger Jonsson, Järfälla, Sweden

[73] Assignee: Telefonaktiebolaget LM Ericsson, Stockholm, Sweden

[21] Appl. No.: 08/719,921

[22] Filed: Sep. 25, 1996

Related U.S. Application Data

[63] Continuation of application No. 08/262,887, Jun. 21, 1994, abandoned.

[30] Foreign Application Priority Data

Jun. 22, 1993 [SE] Sweden .................................. 9302162

[51] Int. Cl.[6] .................................................. H04Q 7/22
[52] U.S. Cl. ........................................ 455/459; 340/905
[58] Field of Search ............................. 340/825.21, 887; 370/219, 395, 505; 379/279; 455/459

[56] References Cited

U.S. PATENT DOCUMENTS

| | | | |
|---|---|---|---|
| 4,812,843 | 3/1989 | Champion, III et al. ............... | 340/905 |
| 5,090,051 | 2/1992 | Muppidi et al. ........................... | 379/61 |
| 5,185,741 | 2/1993 | Iguchi et al. .......................... | 370/110.1 |
| 5,295,179 | 3/1994 | Asahara et al. . | |
| 5,307,399 | 4/1994 | Dai et al. .................................... | 379/57 |
| 5,394,140 | 2/1995 | Wong et al. ........................ | 340/825.44 |
| 5,442,683 | 8/1995 | Hoogeveen ............................... | 379/59 |
| 5,619,551 | 4/1997 | Yahagi . | |

FOREIGN PATENT DOCUMENTS

| | | |
|---|---|---|
| 398 183 | 11/1990 | European Pat. Off. . |
| 2 125 252 | 2/1984 | United Kingdom . |
| WO93/16545 | 8/1993 | WIPO . |
| WO93/16546 | 8/1993 | WIPO . |

*Primary Examiner*—William Cumming
*Attorney, Agent, or Firm*—Burns, Doane, Swecker & Mathis, L.L.P.

[57] ABSTRACT

A slave switch having a number of connections for traffic with switch-external users, and a number of extensions intended for connection with switch-internal users, is disclosed. The slave switch is characterized in that it is constructed to initiate originating calls only, and in that the switch includes by-pass signalling means. A method of communication between the slave switch and a master switch is also disclosed.

9 Claims, 4 Drawing Sheets

5,991,631

SYSTEM IN WHICH CALL CONNECTIONS ARE ESTABLISHED BETWEEN A MASTER SWITCH AND A SLAVE SWITCH VIA BYPASS SIGNALING

This application is a continuation of application Ser. No. 08/262,887, filed Jun. 21, 1994, abandoned.

BACKGROUND OF THE INVENTION

The present invention relates to a telephone switch from which only originating calls are made. The switch can be considered as being a slave switch to a superordinate or master switch which functions as an intermediary for incoming traffic to users in the slave switch. The directory numbers of the users of the slave switch belong to the number series of the master switch, and consequently an incoming call is directed to the master switch. Instead of connecting the incoming call to the slave switch, the master switch performs a by-pass signalling procedure to the slave switch, which in response to the by-path signals makes an outgoing call which "meets" the incoming call in the master switch. By by-pass signalling is meant signalling over a signalling path which is separate from the connection path. According to one preferred embodiment of the invention, the slave switch is mobile and permits traffic between a local network and a host network. The local network may be a fixed line network or a business-cordless network, and the host network may be the fixed telephone network or the mobile telephone network.

DESCRIPTION OF THE PRESENT STANDPOINT OF TECHNIQUES

A private branch exchange (PABX) permits local traffic between a user connected to the exchange and incoming and outgoing traffic with users outside the exchange. A private exchange will have a plurality of extension numbers, one to each of the local users of the exchange, and a number of lines which pass to the nearest telephone station in the telephone network. The company has a so-called group number which is published in the telephone directory and which is associated with the lines to the telephone station. When the exchange is to originate a connection from an exchange-internal user, the exchange looks for an unoccupied line and establishes an outgoing connection (sets up an outgoing call) on this line. Two cases can occur when a private exchange terminates a connection (receives an incoming call) depending on the type of exchange concerned. In the case of one type of exchange, the exchange will have a group number which is common to all the users connected to the exchange. In the case of the other type of exchange, the exchange enables direct selection of the users connected to the exchange. In the case of the first type of exchange, selection of extension is effected in a separate operation, for instance with the aid of a telephone operator. In an exchange of this first type, the B-number is terminated in the telephone station. In the case of the second type of exchange, it is necessary to forward the B-number from the telephone station to the private exchange and a number analysis of the last digits in the B-number is made in the private exchange. The extension selection is made on the basis of this number analysis. The individual extensions/subscribers have individual telephone numbers. The individual number is typically a four-digit number. For instance, the number 7771234 may identify the extension number of an individual person, whereas the number 7770000 is the number advertised by the company in the telephone directory, on letterheads, etc.

Seen from the aspect of the host network, a call to the private exchange will result in the call being allocated a line which is free, at the time of receiving the call, said line being selected among the lines commonly available for traffic with the private exchange, irrespective of the type of exchange concerned.

If a company which has a private exchange moves from one district to another, the company is forced to change its telephone number and to order a new group number from the telephone network operator. If the exchange concerned is the aforesaid second type of exchange, it is necessary to allocate to the exchange a free series of numbers containing individual numbers. This intention to move premises must be announced in good time, so that the telephone network operator requires a relatively long period of time to prepare and effectuate coupling of the exchange on the new premises. With regard to the company itself, the change of telephone number means that the company must change its letterheads and directory data, etc., which costs money. The company's clients must also be informed of the new telephone number, which is a drawback from both the company's and the client's point of view.

Instead of changing the telephone number of a company, the telephone network operator is able to change its routing tables, so that calls which use the old telephone number are routed to the new destination. This alternative involves practical and administrative problems which take time to resolve and which cost money.

Another alternative to changing the telephone number of a company is for the company to utilize a 020 number (800 number in the U.S.A.). A 020 number goes to a fixed service node, so-called service switching point, SSP, in the network. The call is forwarded from this service node to the private exchange of the company concerned. The private exchange can therefore be moved from one district to another district without the company needing to change its telephone number. However, the use of a 020 number for direct dialling to a mobile user requires each user to have his own individual 020 number, and also requires the operator of the 020 service to handle number translation information.

The connections of a private exchange to the host network is a resource that should be used in the most efficient way. This is not the case, however, with present-day private exchanges. If a user, who is called by A is engaged with a call from B, a call is setup from A to the private exchange and A hears a busy tone. This call constitutes unnecessary use of the private exchange lines to the host network. If the private exchange is a small exchange, it must have a local capacity margin. However, dimensioning of such an exchange to ensure that it will have the capacity to meet high traffic conditions is very costly.

EP-A2-398,183 describes a signalling procedure which enables the set up of a call to which there is associated a supplementary service, said call being established in the public telephone network, despite the inability of the public network to transmit information relating to the supplementary service. Such information is transmitted on a separate signalling path. The invention assumes that those end nodes between which the connection is established have equipment for direct selection (Direct-In-Dial) and equipment for establishing originating connections without assistance from the telephone operator (Direct-Out-Dial). Such equipment requires unconditionally that the exchange is allocated numbers from the number series of the public network. If the end node is moved from one district to another, then it is also necessary to change the directory number to the end node, and this known system therefore has the same drawbacks as those earlier described.

SUMMARY OF THE INVENTION

An object of the invention is to eliminate the aforesaid drawbacks and to provide a solution which will ensure that the user retains his directory number irrespective of the district to which the company moves.

The characteristic features of the invention are set forth in the following Claims. The invention enables a company to change its place of residence temporarily, for instance to take part in an industrial exhibition, and needs only to take with it its own slave switch and connect this exchange to a number of existing lines that have been rented beforehand, for instance from the exhibition organizer, and therewith receive telephone traffic to the company while retaining the company's standard directory number. It is not necessary for the existing lines to have any relationship with the number series and neither is it necessary to engage the host network operator.

The invention can be further improved by replacing the fixed lines between the users and the exchange in the local network with cordless connections, and therewith eliminate the need to install fixed telephone lines in a building.

Still another improvement of the invention is to connect the slave switch to a national covering or continent covering mobile telephony network instead of to the fixed telephone network. The fixed lines between the private exchange and the telephone station are replaced with a number of mobile telephone subscriptions and a number of transceiver units for mobile telephony. According to one variant, in the case of this improvement of the invention, the slave switch can be connected to the fixed network via a combination of cordless connections (i.e. mobile network connections) and line connections (fixed lines).

The host network need not route calls to the slave switch, because only outgoing calls are made from the slave switch. The host network need therefore not be aware of the destination address of the slave switch and the slave switch can thus be connected to any free pairs of lines in the fixed telephone network. This will release the slave switch from the number plan of the host network and will enable the slave switch to be moved from district to district without the company that owns the switch needing to change its directory number.

According to the present invention, the problem of relieving the slave switch of unnecessary calls and the problem of dimensioning the slave switch with a high traffic load margin, is so solved that no unnecessary calls are forwarded to the slave switch but are instead terminated in the master switch. The master switch is allocated functions for handling unnecessary calls, for instance a telephone operator or a spoken message playback machine which informs the caller that the called subscriber is busy. Other traffic controlling functions can also be placed in the master switch, in accordance with the invention. Examples of such traffic controlling functions include voice mail boxes, a spoken message device, a telefax mail box and like functions. According to another variant of the invention, the master switch serves a number of slave switches and will therewith smooth the traffic over many users. The traffic controlling functions in the master switch are used in a much more effective manner than when the exchange serves only one slave switch.

BRIEF DESCRIPTION OF THE DRAWINGS

The invention will now be described in more detail with reference to the accompanying drawings, in which

FIG. 1 illustrates a conventional public telephone network 1 which includes a number of telephone stations, of which one telephone station 2 is shown. A private exchange 3 is connected to the telephone station 2 by a number of lines collectively referenced 4. A number of users 5 are connected to the private exchange 3 via a number of extensions collectively referenced 6. The private exchange 3 is called on a group number associated with the lines 4. An external user 7 who wishes to call one of the users 5 dials the group number. Subsequent to routing and number analysis in different telephone stations (not shown) in the network 1, the call arrives at the telephone station 2. A B-number analysis is carried out in the telephone station and a free line 4 to the private exchange 3 is selected and the call is terminated in the exchange. If the exchange is operated manually, the exchange telephone operator asks who the caller wishes to talk to and then connects the selected line 4 with the extension associated with the person concerned. If the person concerned is occupied with another call, the telephone operator will inform the caller 7 to this effect, normally by sending an engaged signal. The call is released when the foreign user 7 does not wish to wait. If the exchange 3 is of the kind which makes direct-dial-in possible, the telephone station 2 forwards to the private exchange 3 the requisite number of digits and a number analysis and selection of extension takes place in the private exchange. FIG. 1 illustrates the routing of the call with the arrows 8, 9, 10. FIG. 1 also illustrates the telephone network 1 which serves as a host network to a local network 11 comprised of the users 5. The private exchange is the interface between the two networks.

FIG. 2 illustrates an inventive exchange. The exchange includes a slave switch 12 which is served by a master switch 13, also referred to as an intermediate. The slave switch 12 is designed for making outgoing calls only. This is achieved with the aid of the master switch 13 and by-pass signalling over a signalling path 14 between the master switch and the slave switch. The master switch 13 is an intermediate of the kind described in our Swedish Patent Application 9200465-4. The master switch 13 is stationary in the telephone network 1 and is implemented in the form of a computer, modem and software for different communication processes as described in the aforesaid Swedish patent application and also in our Swedish Patent Application 9200467-0. As described in the first-mentioned Swedish patent application, two destination addresses (telephone numbers) are allocated to the slave switch 12, which in the following is assumed to be located on the premises of a company. One of these destination addresses is public and is the directory number listed in the telephone directory. The other destination address is secret (is not found in the telephone directory) and is an address which the slave switch 12 uses when communicating with the master switch 13. However, the public destination address does not lead to the slave switch, i.e. not to the company, but to the master switch 13. The signalling path 14 is used for by-pass signalling between the master switch and the slave switch. This is marked by the broken-line double-arrow 14.

Figure 1:
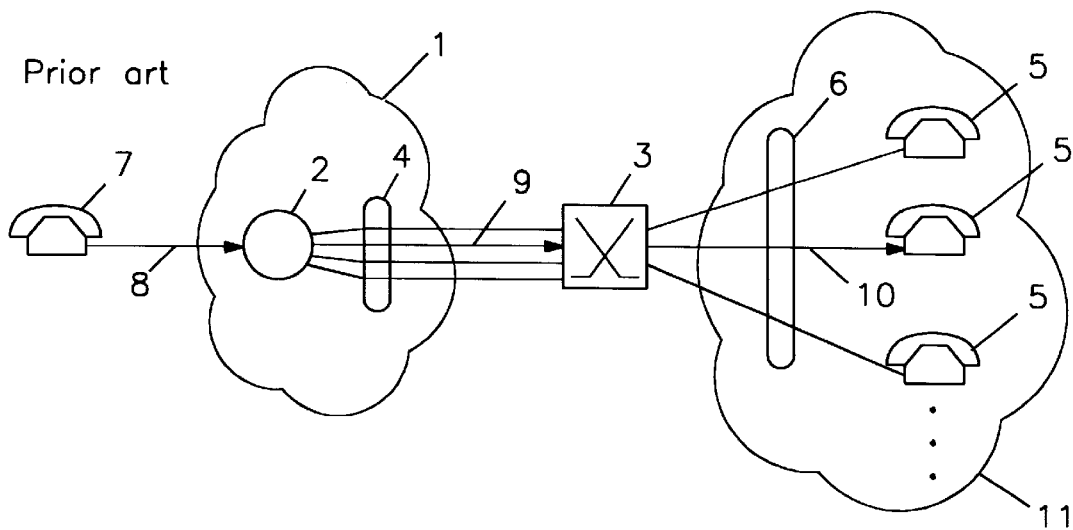
FIG. 1 illustrates a known private exchange, the host network of the exchange and the local network of the exchange.

There will now be given a short description of an example of a communication process between the master switch 13 and the slave switch 12, this method being configured in accordance with the aforesaid Swedish Patent Application 9200467-0. Other communication methods, perhaps better methods than that described in more detail below may occur.

INCOMING CALLS

An incoming call directed to a specific user 5 is referenced Y in FIG. 2 and is handled in the manner described with reference to FIG. 3. A foreign user 7 seeking a specific user 5 dials the company's public telephone number. After being routed in the telephone network, the call arrives at the master switch 13. The master switch parks the call, as shown, by the small ring 15, and the foreign user takes a waiting state during which the following by-pass signalling process takes place between the master switch 13, the slave switch 12 and the user Y. The master switch identifies the person sought by the foreign user and sends an alert signal to the slave switch 12 over the signalling path 14. In addition to the alerting signal, the master switch also sends the identity, referenced Y-ID, of the called user 5. The slave switch 12 then calls the called user Y. If the user is engaged, the slave switch informs the master switch to this effect over the signalling path 14 and the master switch informs the foreign user that the person he wishes to speak to is engaged. This message is preferably delivered by the master switch sending an engaged signal to the foreign user, whereafter the call is connected to a telephone operator. The call is never connected to the slave switch 12 in a case such as this. This obviates the unnecessary use of such network resources as telephone stations, trunk circuits, connection routes, etc. If the called user is free and lifts his receiver, the slave switch informs the master switch to this effect over the signalling path 14. The situation has now arisen in which there are found two "line ends" (the ends of the two call halves) to be connected together, namely the parked call 15 in the master switch and the free extension to the called user Y in the slave switch. These two "line ends" shall now be connected together. The aforesaid Swedish Patent Application 9200467-0 describes a method whereby this connection can be achieved. For instance, the master switch 13 may reserve a temporary telephone number, called an IA-number (interaction number) which according to the number series belongs allocated to the master switch 13. The master switch notes that the reserved number is used for the desired connection between the called user Y and the foreign user 7 who is parked in the master switch 13. There is therewith established a relationship between the desired connection with the called user Y and the reserved IA-number. The master switch then sends the IA-number, referenced IA(Y), to the slave switch 12 over the signalling path 14. When the slave switch is in receipt of the IA-number, the slave switch 12 calls the master switch 13 using IA(Y) as the destination address and connects the call to the user Y extension. The master switch 13 terminates the call from the slave switch and discovers that a call has arrived on a port 16 which refers to the number IA(Y) and looks in a table to ascertain the purpose for which this IA-number has been reserved. The master switch finds that the number has been reserved for the desired connection with the parked call 15 and the master switch now connects the ports 15 and 16 together, as indicated by the full line 17. The connection between X and Y is now established. Both the user 7 and the exchange 12 have each initiated a respective originating connection and the two connections meet one another in the master switch in which they have been joined together. The paths followed by the two originating connections are shown by the arrow 18 and by the arrows 19, 20 and 21 in FIG. 2.

OUTGOING CALLS

When the user Y wishes to make an outgoing call, he/she dials the number of the desired subscriber, in this illustrated case the subscriber 7. The number is captured by the slave switch 12. The slave switch parks the user's call and the slave switch initiates a by-pass signalling process over the signalling path 14 for a connection with the user 7. This request includes the destination address (the telephone number) of the called user and, when applicable, also an identification of the service desired, in this case the setup of a call. The master switch now applies a communications procedure of the kind described in the Swedish Patent Applications 9200468-0 and 9200465-4, to establish communication between the subscriber 7 and the user Y. The communications procedure therewith applied can be configured in many different ways. For instance, the master switch may call the subscriber 7. If the subscriber is free and lifts his receiver, the call to the subscriber 7 is parked in the master switch and the master switch transmits back to the slave switch, via the signalling path 14, an IA-number, referenced IA(7), which the master switch has earlier associated with the subscriber 7. The relationship between the IA-number and the user is registered in a table. The slave switch receives this IA(7)-number and then calls back to the master switch stating the IA(7)-number as destination address. At the same time, the slave switch connects the user-Y extension with the outgoing line on which the call back to the master switch was made. When the master switch receives a call which refers to IA(7), the master switch looks into its table and finds that a call with this reference shall be connected to the parked call from subscriber 7. The master switch now interconnects the parked call from the subscriber 7 with the incoming call from the exchange 12 and its extension Y.

If the party called by the master switch and with whom the user 5 wishes to establish communication does not lift his/her receiver, the master switch informs the slave switch 12 to this effect over the signalling path 14 and the slave switch 12, in turn, informs the user 5. The user 5 can now elect to request the supplementary service automatic callback at a later time or ask for an annulment of further callback. The user 5 informs the slave switch 12 of the choice that he has made and, in turn, the slave switch 12 reports this choice to the master switch 13 over the signalling path 14. When the user 5 requests a callback at a later time, this request is registered by the master switch and another attempt to call the subscriber with which the user 5 wishes contact is made at a later time. This procedure is then repeated. Another communication method for outgoing calls is described in our Swedish Patent Application 9200468-8.

ADVANTAGES

It is irrelevant to the public telephone network 1 which telephone numbers the slave switch 12 has associated with its incoming lines 4, since the public telephone network need never to learn of the location of the slave switch 12 in the network. It is always the slave switch that rings out. The fixed telephone network 1 need not therefore have a routing path to the slave switch. The slave switch can thus be connected to any lines whatsoever. Those lines to which the slave switch is connected need not even have consecutive numbering in the number series to the telephone station within which the switch is located. According to the invention, the network routes telephone calls solely to the master switch 13 and the master switch is stationary. A connection is not established until the master switch has received information to the effect that the called user can be reached. The lines 4 between the slave switch 12 and the telephone station 2 are therefore not loaded unnecessarily by such calls in which the calling user simply hears an engaged signal.

If it is necessary for the company to move to another district or another region, the company takes with it its slave switch 12 and connects the switch to a number of lines, any lines whatsoever, in the new district. The master switch 13, on the other hand, is left in its original place and receives all incoming calls as usual. All that the company requires in the new district is a number of lines to which the slave switch 12 can be connected. These lines can be provided by the network operator or by another organisation, for instance an exhibition hall, a company hotel, etc. If the lines are provided by the network operator, all that is needed is to connect the slave switch to the lines and traffic can begin. The network operator need only note the new user of the lines. The network operator then bills the company for the use of the lines.

If the company is to participate in an exhibition or fair, for instance, and the exhibition organizer has hired a number of lines with existing numbers, the company need only take with it its slave switch and plug it into the lines concerned and traffic to the company has been organized while retaining the old directory number. It is not necessary for the network operator to know which company uses the lines, since the network operator bills the exhibition organizer. The exhibition organizer, in turn, bills the company. The same applies to a company hotel.

Figure 2:
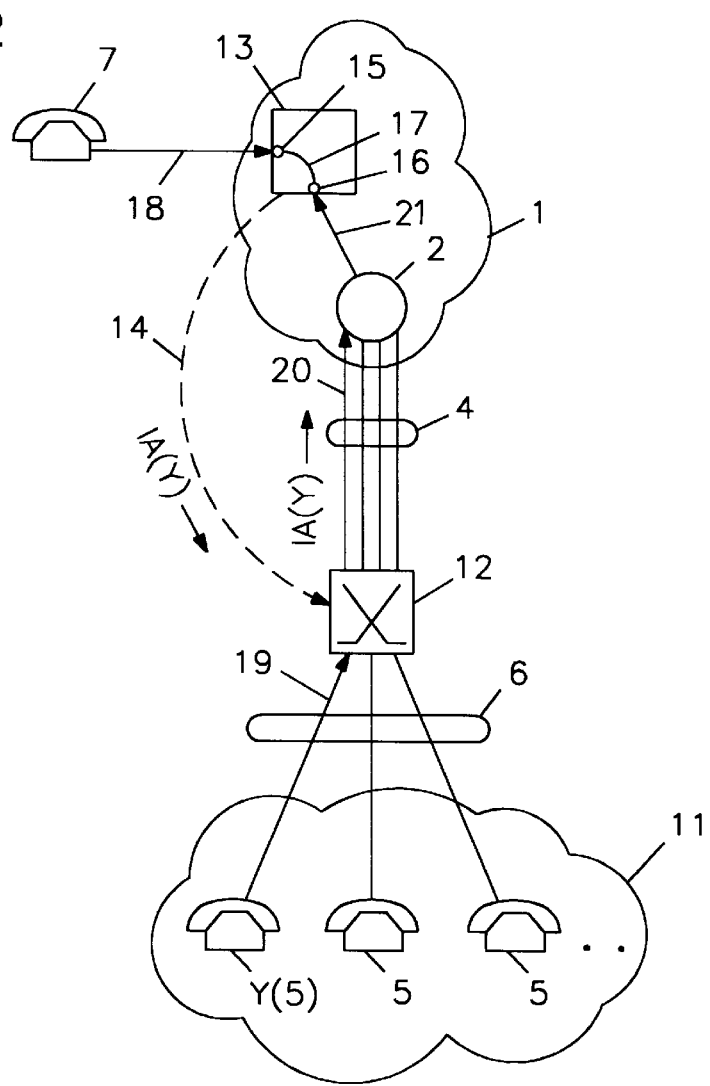
FIG. 2 illustrates an exchange according to the invention which includes a master switch and a slave switch.
Figure 3:
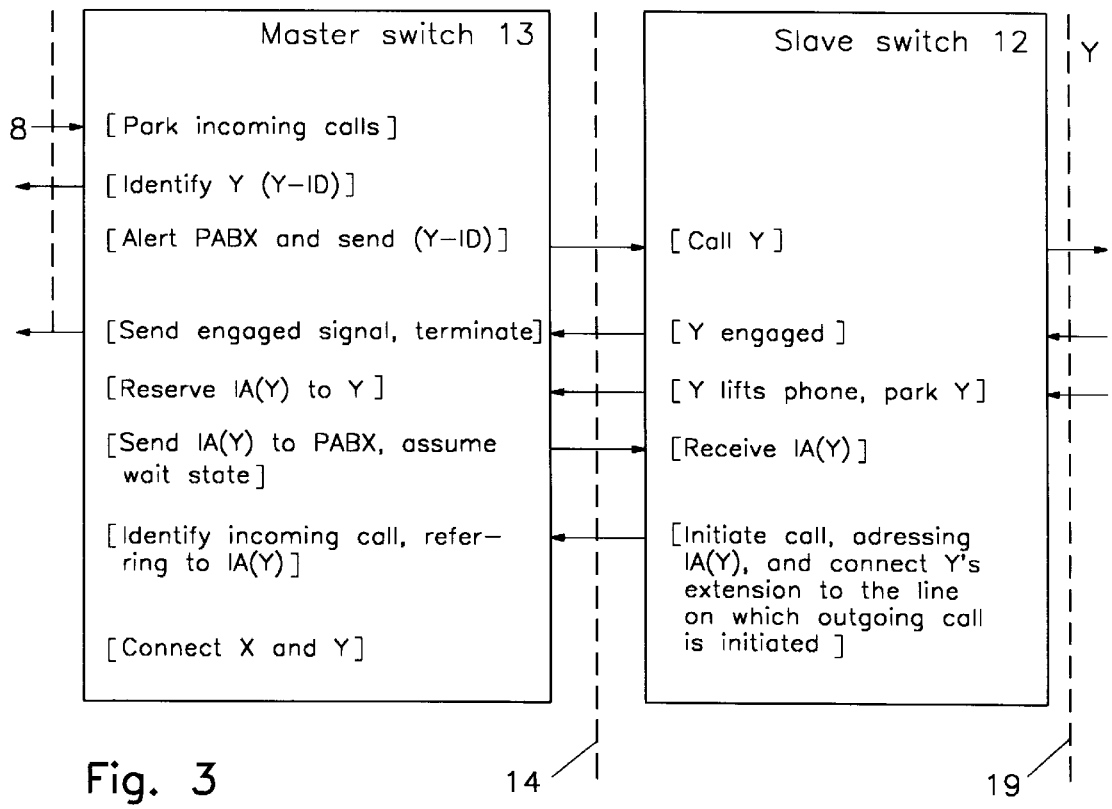
FIG. 3 illustrates diagrammatically an example of different processes that can be effected by by-pass signalling between the master switch and the slave switch in FIG. 2.
Figure 4:
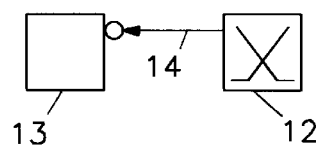
FIG. 4 illustrates a first method of effecting by-pass signalling over a signalling path between the master switch and the slave switch in FIG. 2.

The signalling path 14 illustrated in FIG. 2 can be implemented in different ways. FIG. 4 illustrates an example in which the signalling path is formed by a connection from the slave switch 12 to the master switch 13 in the standard telephone network 1, by allocating this connection a secret number which the master switch places at the disposal of the slave switch. The secret number is thus known only for the slave switch 12.

Figure 5:
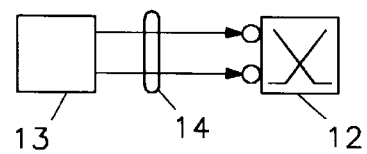
FIG. 5 illustrates a second method of effecting by-pass signalling between the master switch and the slave switch in FIG. 2.

The signalling path 14 can also be established by the slave switch 12 calling the master switch 13 and informing the master switch of the numbers to which the slave switch is connected. The master switch is then able to use all of these numbers in its internal communication with the slave switch 12. It should be noted that the network operator does not use these numbers to forward calls to the exchange. All calls directed to the company will namely be parked in the master switch. In the embodiment illustrated in FIG. 4, the slave switch 12 is allocated the secret number on a permanent basis, whereas in the FIG. 5 embodiment the master switch 13 uses a signalling path 14 on a dynamic basis, i.e. each time it is necessary to signal towards the slave switch 12.

Figure 6:
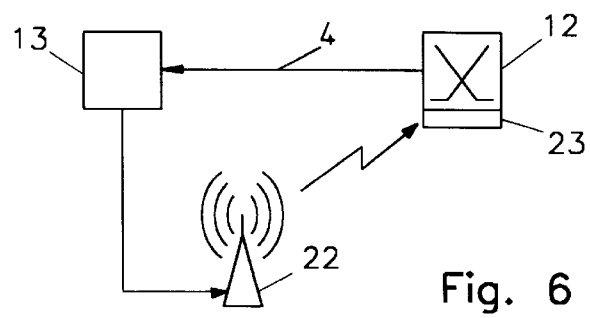
FIG. 6 illustrates a third method of effecting by-pass signalling between the master switch and the slave switch in FIG. 2.

A third method of establishing the signalling path 14 is shown in FIG. 6, according to which the signalling path is established with the aid of a paging network. The master switch 13 sends a paging message to a paging center 22, preferably a national or continent covering center via the standard telephone network. The paging message is sent over a radio network and is received by a paging module 23 belonging to the slave switch 12. It is assumed in this case that the slave switch has an earlier agreement with the master switch to make an outgoing call on a line 6 upon receipt of a paging signal, with the master switch as the destination. In this case, when the slave switch receives the paging signal, the slave switch calls the master switch and the signalling path 14 is therewith established.

Present-day existing paging networks are felt to be too slow for use in serving calls in real time. One alternative is for the master switch to make a call in the mobile telephone network and give as the destination a mobile terminal with which the slave switch is equipped. The slave switch need not answer the call, but understands the calling signal to be a command to contact the master switch, analogous with that described in the preceding paragraph. After having received the calling signal in its mobile terminal, the slave switch makes an outgoing call to the master switch on a free line 4 and the signalling path 14 is therewith established.

Figure 7:
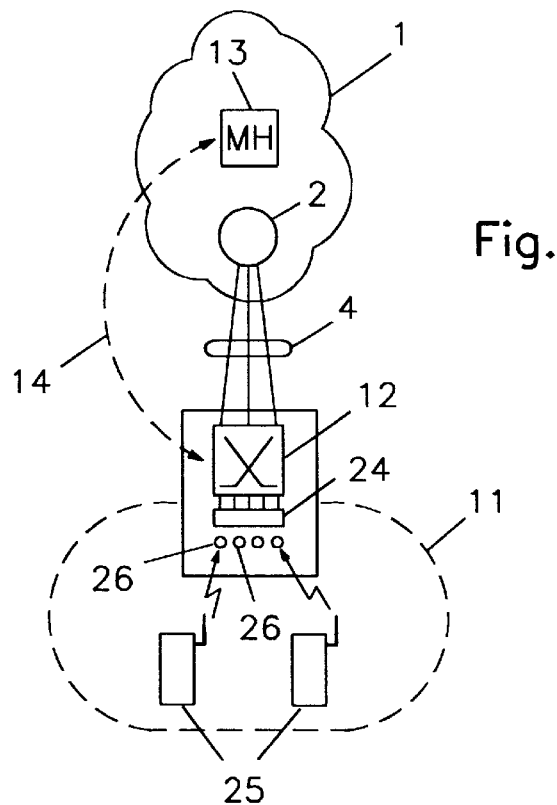
FIG. 7 illustrates a second embodiment of an inventive switch.

FIG. 7 illustrates a further embodiment of the invention. In the case of this embodiment, the slave switch 12 has no fixed lines which lead to the users. Instead, the slave switch extensions are connected to a radio switch 24 of the kind used, for instance, in business-cordless-networks, and each user is equipped with a handportable telephone 25 which communicates via radio with one of a number of base units 26 which are connected to the extensions of the radio switch 24. The users in the local network 11 are able to communicate internally in the slave switch 12 without entering the public telephone network 1. The users in the local network 11 share a common group of lines 4 from the slave switch to the public telephone network 1. This avoids the necessity of installing fixed lines 6 in the building in which the company is resident.

Figure 8:
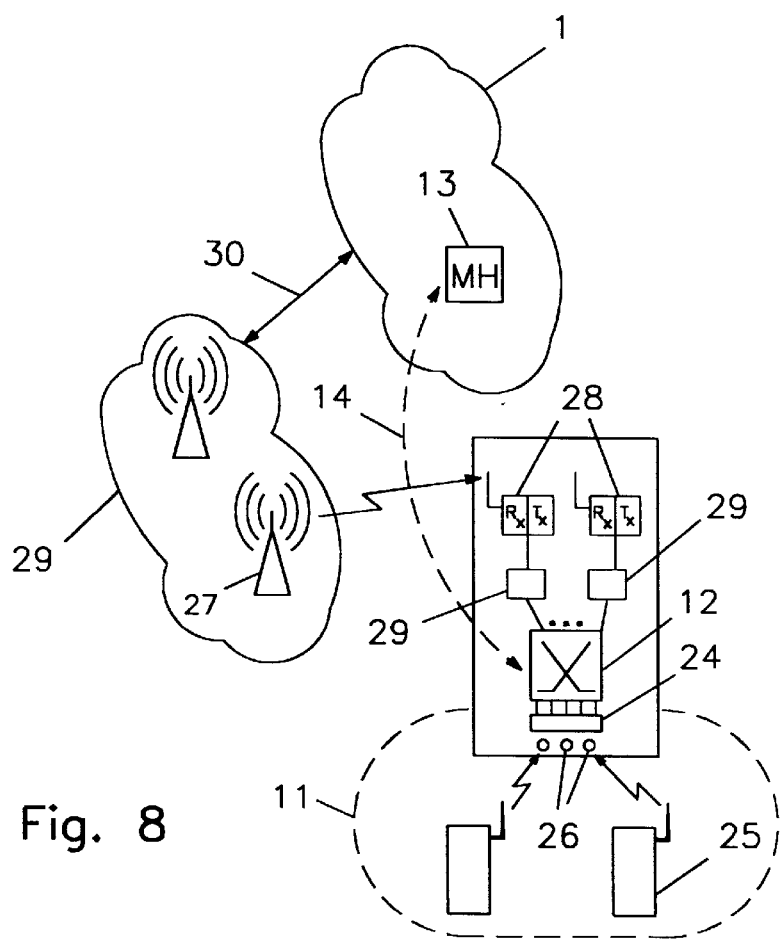
FIG. 8 illustrates a third embodiment of an inventive switch.

FIG. 8 illustrates still another embodiment of the invention. According to this embodiment, the slave switch 12 has no lines 4 leading to the public telephone network and the slave switch is, instead, connected to a nation or continent wide mobile telephone network 35, alternatively a metropolitan mobile telephone network, via the base station 27 that is located nearest the slave switch 12 geographically. In this case, the fixed lines 4 between the slave switch and the master switch are replaced with a number of mobile subscriptions and a number of mobile telephony transceiver units 28. An adaptation circuit 29 is provided between each transceiver unit 28 and the slave switch 12. The users in the local network 11 communicate with one another and with the switch by handportable telephones 25 and a radio switch 24, in the same way as with the embodiment according to FIG. 7. The mobile telephony network 35 is connected to the public telephone network 1 in a known manner, as symbolically shown by the double-headed arrow 30. This enables the slave switch 12 to be moved or to become mobile and can be placed anywhere in the area covered by the mobile telephony network 26. Additional mobile telephony subscriptions can be covered as necessary, should the company expand. This enables the company to extend the traffic capacity of the slave switch successively. The customer's clients still call the company on one and the same number. Since the calls are not connected to the users until the users are prepared to answer the call, the number of necessary connections via transceiver units is reduced.

Figure 9:
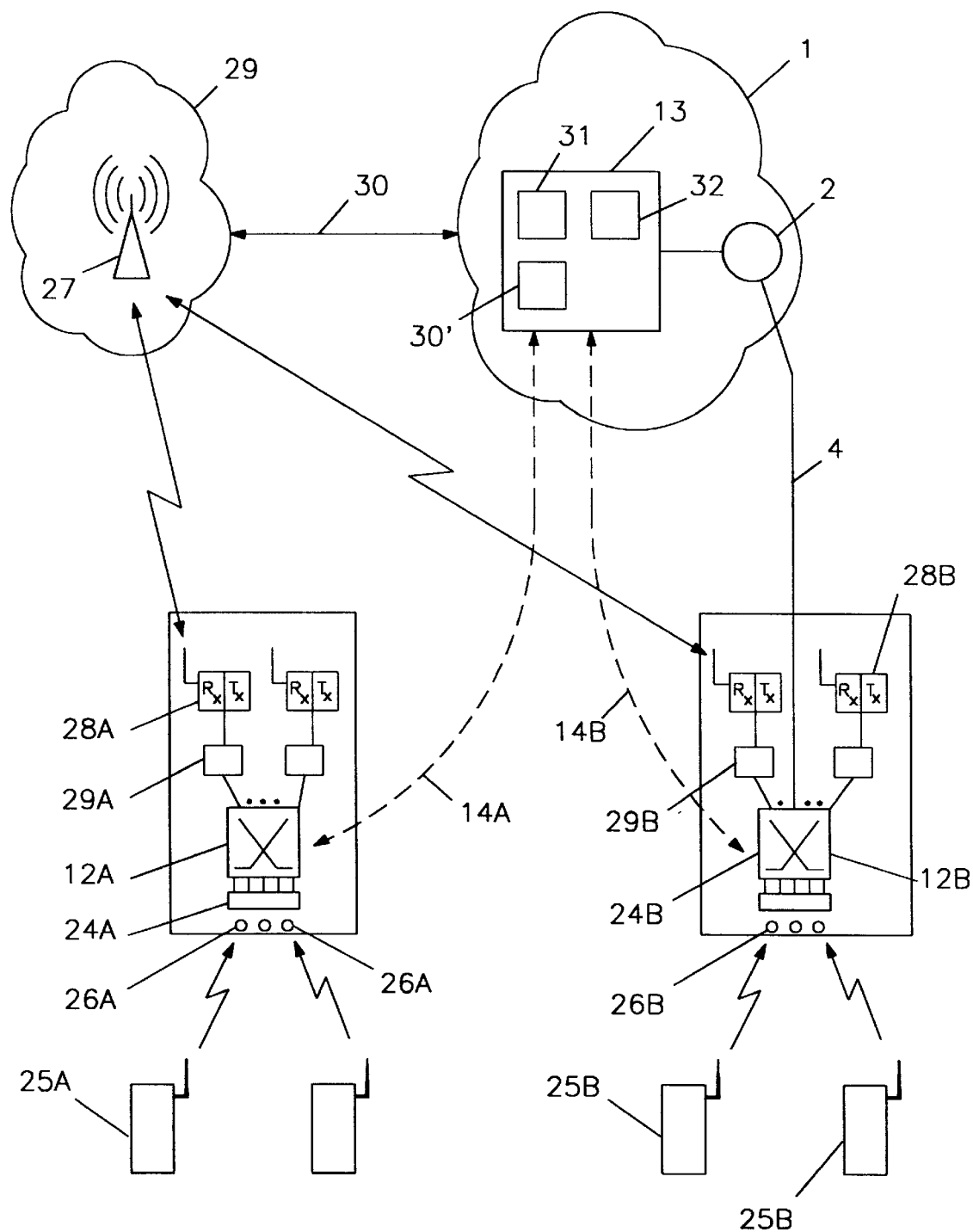
FIG. 9 illustrates a master switch which serves a number of slave switches.

FIG. 9 illustrates an embodiment similar to the FIG. 8 embodiment but where the master switch 13 serves a plurality of slave switches, in the illustrated case two slave switches 12A and 12B. Each slave switch has a respective individual signalling path 14A and 14B to the master switch. The master switch 13 is provided with a pool of IA-numbers which are common to the slave switches. Each slave switch has its respective group of local users 25A and 25B. All transceiver units 28A and 28B in the slave switches use the mobile telephone network 35. In the case of this embodiment, the master switch 13 includes a number of traffic control functions common to the slave switches. The block 30 identifies speech message equipment which includes a number of recorded spoken messages, block 31 identifies two voice mail boxes, one intended for spoken messages to users in the slave switch 12A and the other for spoken messages to users in the slave switch 12B. The block 32 identifies two fax mail boxes, one intended for users of the slave switch 12A and the other intended for users of the slave switch 12B. This equipment can be used in many different ways. For instance, the speech message equipment informs a foreign user that a called subscriber is busy, if such is in fact the case. If all transceiver units of a slave switch are occupied by ongoing calls, the speech message equipment 30 will deliver a spoken message to this effect and ask the foreign user to leave a message, which is then recorded in the voice mail box 31 belonging to the slave switch concerned. A fax mail box 32 receives fax messages directed to the subscribers in the slave switch to which the fax mail box belongs. At a suitable time and when a connection/transceiver unit is free, the master switch signals to the slave switch that there is a fax message to be collected. The slave switch then sets up a connection with the master switch and collects the messages recorded in the fax mail box. Other functions than those described can be included centrally in the common master switch. This enables a slave switch to be dimensioned for high traffic with only a moderate economic investment on the capacity margin, and to provide a slave switch with a number of "virtual" services.

The slave switch 12B is also shown to have at least one fixed line 4 to the telephone station 2. This is done as a safety measure, so as to cover the event of malfunctioning of the mobile telephone system, for instance should one or more transceiver units 28B or the base station 27 break down. The fixed line or lines 4 then enable outgoing calls to be made from the slave switch 12B.

I claim:

1. A slave switch for connection to a first network over at least one outgoing line, said slave switch comprising:

by-pass signalling means for receiving an alert signal indicative of an incoming call to a user connected to the slave switch; and means for initiating an outgoing call over said outgoing line in response to said alert signal;

wherein said slave switch allows outgoing calls only by discarding any direct incoming call to any of its users.

2. A slave switch in accordance with claim 1 wherein said slave switch comprises a public branch exchange with a plurality of extensions to which telephone instruments are connected.

3. A slave switch in accordance with claim 1 wherein said slave switch comprises a public branch exchange with a plurality of extensions to which a radio switch is connected.

4. A slave switch in accordance with claim 3 wherein a number of base stations are connected to said extensions.

5. A slave switch in accordance with claim 4 wherein portable hand held cordless telephones communicate with said base stations.

6. A slave switch in accordance with claim 1 wherein said first network is the public telephone network and said line comprises telephone lines.

7. A slave switch in accordance with claim 1 wherein said first network is a mobile telephone network and said line comprises transceiver units.

8. A slave switch in accordance with claim 1 wherein a telephone number of said slave switch is terminated in a local exchange of a public switched telephone network, said local exchange serving as a master switch for said slave switch.

9. A slave switch in accordance with claim 8 wherein the slave switch is provided with signaling means for signaling with the master switch.

* * * * *